Nov. 20, 1951 F. R. STEMP 2,575,848
GRAPEFRUIT CUTTING IMPLEMENT
Filed May 9, 1949

INVENTOR.
Frank Ronald Stemp

Patented Nov. 20, 1951

2,575,848

UNITED STATES PATENT OFFICE 2,575,848

GRAPEFRUIT CUTTING IMPLEMENT

Frank Ronald Stemp, New York, N. Y.

Application May 9, 1949, Serial No. 92,157

1 Claim. (Cl. 30—24)

This invention relates to an implement for therewith cutting out the sectoral flesh bodies of a half-grapefruit. Heretofore, this preparation of the grapefruit or similar half citrous fruit, usually performed with a knife or saw, was strenuous, messy, unclean, insanitary, inefficient, and much wasteful of the flesh and juice of the fruit.

The principal object of the invention is to provide an improved grapefruit cutting implement wherewith the aforesaid disadvantages will be remedied, and which will be furthermore conveniently and economically manufacturable, salable at low cost, simple, strong, durable, reliable, and operable with ease, convenience, and efficiency.

Other objects and advantages will hereinafter appear.

Figure 1:
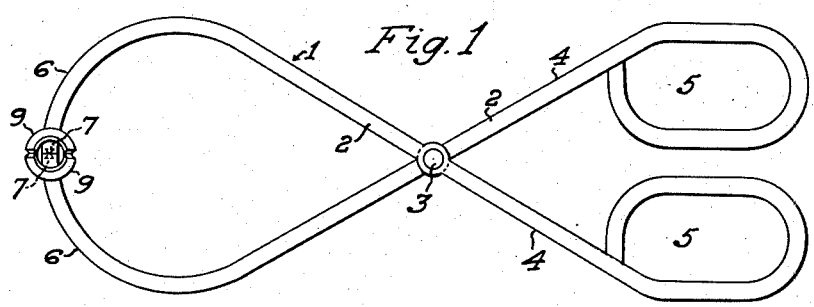
Fig. 1 is a top plan view of the grapefruit cutting implement constituting the invention.
Figure 2:
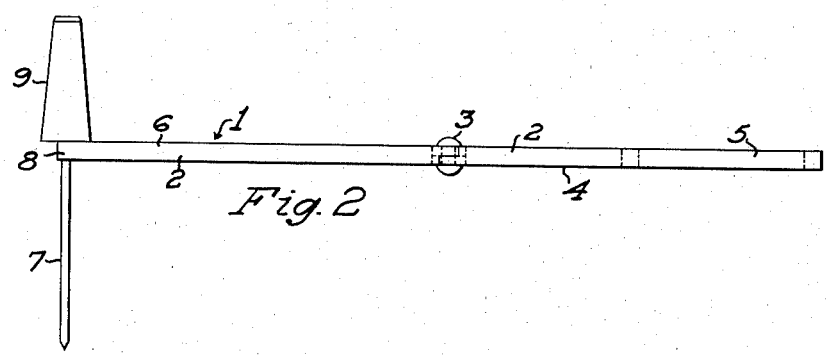
Fig. 2 is an elevational view of the implement shown in Fig. 1.

The grapefruit cutting implement 1, Fig. 1, includes a pair of scissors-like levers 2 hinged to each other about a pivotal pin 3, and providing manipulating arms 4 with ears 5 and operative legs 6. To the terminal of each of the legs 6 is secured a wire-like cutter 7 which projects downwardly therefrom and rightangularly to the levers 2, as shown in Fig. 2. Each of said terminals 8 also carries a semi-frusto-conical cutter 9 with cutting edges 10, which cutter is disposed oppositely to the cutter 7, and projects upwardly and rightangularly to the levers 2, as illustrated in Fig. 2.

Figure 3:
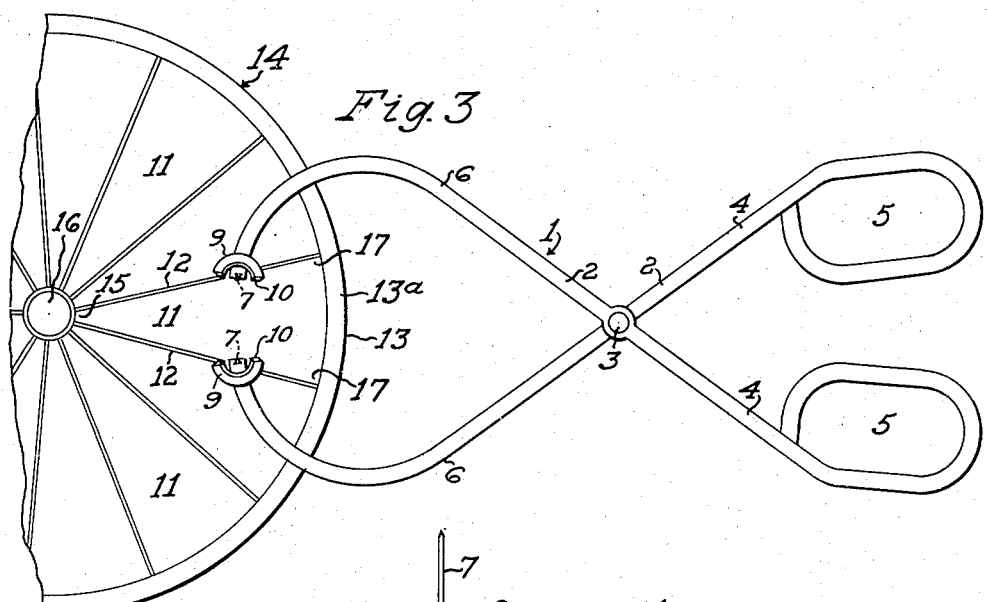
Fig. 3 is a top plan view of the implement shown in Fig. 1, but illustrating it as it appears while in operative condition during cutting out of the sectoral flesh body of the grapefruit.

In the operation of the implement 1, for cutting away each sectoral flesh body 11 from its radial pulp walls 12 and ring 13 of the half-grapefruit 14, Fig. 3, it is first grasped in manner of a pair of scissors by its ears 5, and with the implement in the closed condition shown in Fig. 1 its conjoint cutters 7 are inserted into the fruit by piercing them thereinto at the junction 15 of the walls 12 of the sector 11. The implement is then drawn away from the core 16 backwardly, and its ears 5 are spread apart simultaneously, which action causes the cutters 7 to traverse alongside and contactingly with the walls 12 until reaching their junctions 17 with the rind 13, to thereby cut the flesh body 11 away from the walls 12. Thereupon, the ears 5 are brought together, to the closed position shown in Fig. 1, which action causes the cutters 7 to traverse from the junctions 17 to a meeting with each other alongside and contactingly with the rind 13, in which manner the flesh body 11 is cut away from the segment 13a of the rind 13.

Figure 4:
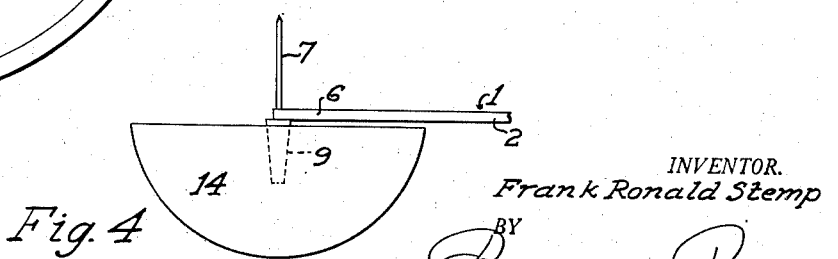
Fig. 4 is a fragmentary elevational view, in a reduced scale, showing the implement as utilized for cutting the core of the fruit.

Should it be desired to cut away the core 16 from the pulp walls 12, the implement 1 is reversed, as shown in Fig. 4, its arcuate cutters 9 are spread apart sufficiently to encompass said core, then the cutters are pierced into the fruit as shown, and while the grapefruit and cutters are in this relative position the former is partially rotated with one hand as the implement is held with the other, until all of the walls 12 are cut away from the core. Also, if desired, the combined cutters 9 may be utilized as pincers by holding the implement and manipulating it with its ears 5, to thereby extract the seeds from the fruit.

Variations may be resorted to within the scope of the invention, and portions of the improvements may be used without others.

Having thus described my invention, I claim:

An implement for severing out the sectoral flesh body of a half citrous fruit comprising a pair of levers having their median portions pivoted to each other, the manipulating end portions of said levers having ears, the end of each operative portion of said levers carrying a bar-like member adapted for separating said flesh body from the radial pulp wall and rind of the fruit, and said members being in registry with each other when brought together by manipulation of said ears, whereby piercing both of said registered members into the flesh body near the core of the fruit, then withdrawing the implement in a direction away from said core while spreading said members apart with said ears, and then returning said members with said ears to said registered position upon the members reaching the rind of the fruit will sever the flesh body from the fruit.

FRANK RONALD STEMP.

REFERENCES CITED

The following references are of record in the file of this patent:

UNITED STATES PATENTS

| Number | Name | Date |
|---|---|---|
| 881,890 | Barr | Mar. 17, 1908 |
| 1,207,488 | Brock | Dec. 5, 1916 |
| 1,286,093 | Poplawski | Nov. 26, 1916 |
| 2,325,031 | Berns | July 27, 1943 |